3,333,017
POLYMERIZATION PROCESS AND COBALT OXIDE-METAL OXIDE CATALYST THEREFOR
James M. Schuck, Webster Groves, Robert G. Schultz, Vinita Park, and Morris R. Ort, Kirkwood, Mo., assignors to Monsanto Company, St. Louis, Mo., a corporation of Delaware
No Drawing. Filed Nov. 6, 1963, Ser. No. 321,803
5 Claims. (Cl. 260—683.15)

This invention relates to the polymerization of olefins to normally liquid products. More particularly, this invention relates to an improved process for preparing substantially straight chained liquid olefin products by dimerizing olefins, and to a catalyst to be used in that process.

Briefly, this invention provides ammoniated mixed metal oxide on activated carbon compositions and a process for using those compositions as catalysts in the polymerization of alpha olefins having from 2 to about 10 carbon atoms per molecule to liquid olefin products which are predominantly straight chained. The mixed metal oxide component of the composition comprises (1) an oxide of a metal of the following group: iron, magnesium, zinc, zirconium, lead, bismuth, nickel, copper, and aluminum, and (2) cobalt oxide. These metal oxides on the carbon are obtained by impregnating the activated carbon component with a heat decomposable salt of the respective metal which salt is decomposable to the respective metal oxide upon heating the metal salt impregnated activated carbon in an inert atmosphere up to 300° C. Surprisingly, none of the metal oxides of group (1) impregnated on carbon, by itself, is able to dimerize alpha-olefins.

The composition may be ammoniated by several means: (1) by washing or treating the activated carbon with ammonium hydroxide, or an equivalent material such as a gas containing ammonia, or liquid ammonia, until the carbon has taken up as much as it is able, and drying the thus ammoniated carbon before impregnating it with a solution of the respective metal salt or oxide compound, (2) by treating the dried mixed metal salt oxide impregnated carbon with an ammoniating agent such as ammosium hydroxide as described above, and drying the ammoniated metal salt or oxide impregnated carbon before or as part of the heating step necessary to activate the composition for use as a catalyst, or (3) preferably by ammoniating the activated carbon as described in step (1) above, and then by repeating the ammoniation after the metal salt or oxide have been precipitated or impregnated into the carbon as described in step (2). This is referred to as the "double base" treated catalyst to distinguish it from a "single base" treated composition of steps (1) or (2), and from the "non-ammoniated" catalyst in which no ammoniation is used in preparing the composition.

The polymerization process of the invention in which the ammoniated mixed metal oxide on carbon compositions are used as catalysts when activated by heating in an inert gas or atmosphere is substantially a dimerization process in which two alpha olefin molecules are joined to form a higher olefin which is a liquid under ordinary conditions. However, when ethylene is the only feed reactant, substantial trimerization to obtain liquid hexene product also occurs. The olefin reactant feed may comprise only one olefin such as ethylene, propylene, hexene-1, or octene-1, decene-1, etc. or it may be a mixture of alpha olefins such as ethylene and propylene, or ethylene and 1-butene, or propylene and 1-butene, pentene-1 and hexene-1, etc.

The largest proportion of these liquid products are straight chained and these straight chained olefins and those with only minimum branching are sought for use as intermediates in the preparation of olefins of detergent length for use in alkylating arene nuclei such as phenol, toluene, benzene, etc. in the process of making biodegradable alkylarylsulfonate detergents. Of course, if the liquid dimer product is of itself long enough ($C_{10}$–$C_{20}$) for that purpose, the olefin product may be used directly.

In this specification and in the claims the term "olefin which is being polymerized" means an olefin having from 2 to about 10 carbon atoms. The term "alpha-olefin" means an olefin as defined above having the double bond thereof between the 1- and 2-carbon atoms of the molecule, i.e., in a terminal position. The term "gaseous alpha-olefin" means an alpha-olefin as defined above which is a gas at standard temperature, pressure, and volume, and generally are those having from 2 to 4 carbon atoms, e.g., ethylene, propylene, and 1-butene, either in the gaseous state, liquid state, or dissolved in a suitable liquid diluent such as benzene, toluene, cyclohexane, decahydronaphthalene, hexane, heptane, etc. or as a compressed liquid, either alone or diluted with liquid alkanes.

The term "drying" in reference to catalyst preparation means removing substantially all of the visible liquid therefrom, i.e., until the treated carbon is visibly dry.

The term "ammoniate" and the adjective and participle variations of such terms such as "ammoniated" "ammoniating agent" etc., in reference to the carbon treatment and catalyst preparation includes the treatment of the carbon used to make the catalyst as well as the treatment of the metal salt and/or oxide impregnated carbon, as well as the simultaneous ammoniation and impregnation of the carbon by the use of ammoniated solutions, and encompasses the use of ammonia gas, liquid ammonia under pressure, aqueous ammonium hydroxide or these materials mixed with inert diluents at subatmospheric, atmospheric, and superatmospheric pressure at temperatures ranging from about −50° C. to about 300° C.

The activated carbons useful for the purpose of this invention may be any porous or absorbent carbon known to be useful for catalyst preparation. The activated carbons of this type generally have surface areas of from about 400 sq. m. to 2000 sq. m. per gram. These carbons may be in the form of compact masses, granules, chips, powder, etc., although the powder form is not preferred. The activated carbons may be from animal or vegetable or petroleum source. For example, there may be used coconut charcoal, wood charcoal, and coke derived from coal, but natural untreated coal itself does not give an effective catalyst for use in the process of this invention, and is not an activated carbon. Other useful carbons include soft bone charcoal, hard bone charcoal, and carbons sold under various trade names for catalyst preparation purposes. Examples of activated carbons sold in commerce include Pittsburgh "BPL," "CAL," "OL," and "SGL" of Pittsburgh Coke and Chemical Co., Girdler "G–32–C," and "G–32–E" of Chemical Products Division, Chemetron Corp., and Barnebey-Cheney Company's "EE–1," "E–H–1" and other activated carbons. The activated carbons may be washed or unwashed. If the carbon is to be washed a typical treatment comprises washing the carbon with aqueous nitric acid, e.g., a dilute nitric acid solution, employing for example about 600–1000 ml. of nitric acid per 500 g. of charcoal. The nitric acid can be of any desired concentration but preferably has a concentration of about 10 to 30 weight percent in water. Contact periods of nitric acid and charcoal of about 5 minutes to 0.5 hour are sufficient to wash the carbon. After the acid wash step the acid treated carbon may be washed with water to remove the acid prior to the ammoniation treatment of the carbon.

As described above the carbon is preferably dried to insure constant weight and accurate determination of catalyst weights which follow. After drying (about 4 hours at 100–120° C. in a vacuum oven is generally sufficient) the carbon is ammoniated in accordance with this invention with ammonia gas, liquid ammonia, or aqueous ammonium hydroxide which may be dilute or concentrated, i.e., the ammonium hydroxide solution is preferably concentrated (15 to 30% by weight) although more dilute ammonium hydroxide solutions may also be used. In a typical ammoniation treatment the carbon is treated with the ammonium hydroxide, preferably in portions, until the carbon will not take up any more ammonium hydroxide (either by absorption or adsorption). When the carbon is completely soaked in the ammonium hydroxide solution, which can be insured by allowing the "wet" carbon to stand for from 0.25 hour to 1 hour or longer; the treated carbon is dried by any means known in the art. A good procedure which can be used to dry the ammonium hydroxide impregnated carbon is to heat the carbon to from 80 to 150° under vacuum until the carbon is substantially dry to the touch. Time periods of from 0.25 to 5 hours are generally sufficient to accomplish this if the impregnated carbon is agitated as by stirring, tumbling, shaking, etc.

For ease in describing the invention, the description will proceed hereinafter using as the activated carbon component of the catalyst composition the ammoniated carbon, prepared as described above. The ammonia pretreated carbons give the most active catalyst upon activation and constitute the preferred mode of preparing the catalyst. However, it is to be understood that it is within the scope of the invention to forego the necessary ammoniation step until after the metal salts have been impregnated into the carbon and dried, or to ammoniate the carbon in the same step as the metal salt impregnation step by use of an ammoniated solvent for the metal salts although these procedures are not necessarily equivalent in the polymerization results obtained with the resulting composition.

The metal oxide components of the compositions used for catalyst purposes in the alpha-olefin dimerization of this invention is derived from two sources:

(1) The metal oxide derived from a heat decomposable salt or a substantially pure metal oxide of one of the following metals: iron, magnesium, zinc, zirconium, lead, bismuth, nickel, copper, and aluminum; and (2) the cobalt oxide derived from a heat decomposable salt of cobalt.

The metal salt of each type (1) and (2) above, should be one which is water soluble, or soluble in an ammonium hydroxide, or soluble in nitric acid to an extent sufficient to impregnate the carbon with the desired equivalent amount of the metal oxide, and which salt is decomposable to the respective metal oxide by heating the metal salt impregnated ammoniated carbon to a temperature no higher than about 300° C.

The salt of the chosen metal from group (1) above is preferably impregnated into the ammoniated carbon in the form of its solution of the desired concentration which is equivalent in weight to the desired weight of the metal oxide, and dried prior to the impregnation of the cobalt salt in the form of its solution in a similar manner. However, for some combinations of these metal oxides of group (1) with cobalt oxide of group (2) the two salts may be co-impregnated into the carbon in a common solution of the two metal salts with only some diminution of catalytic effectiveness of the composition, but for most combinations of metal oxide of group (1) with cobalt oxide, definite advantages are observed when the salt of the metal of group (1) is first impregnated and dried prior to impregnation of the cobalt salt. In any event, reduced catalytic effects are observed when the catalyst used was one prepared by first impregnating the cobalt salt, drying and then impregnating the salt of a metal from group (1) above. Hence, in this sense, the order of addition of the metal salts to the carbon is critical to the advantageous polymerization results obtained according to this invention.

Of the salts of the metals of group (1) above, those of iron, magnesium, zinc, zirconium, lead, and bismuth are preferred. The salts of nickel, copper, and aluminum may be used with somewhat lower yields in terms of alpha-olefin dimer liquid product. We have found that the metal oxides of manganese, boron, lithium, and similar metals and metalloids reduce the yield of liquid dimer product and appear to have a poisoning effect on the activity of cobalt oxide used therewith. Hence, it is not desirable to use such metal or metalloid oxides in combination with cobalt oxide for the process of this invention.

The mixed metal oxide components of the composition generally comprise at least about 4% by weight based on the total weight of the composition but such weight may range up to about 50% by weight of the total composition, the remainder of the weight being attributed to the activated carbonaceous material used as the "activated carbon" component and the ammoniation thereof. The oxide of the metal of group (1), above, may comprise from about 1% to about 25% by weight of the total weight of the composition; the cobalt oxide comprises the remainder of the metal oxide weight of the composition. The cobalt generally comprises at least about 0.5% to about 25% by weight of the total composition. Optimum percent weight ranges of the oxides of the metal of group (1)) above will vary somewhat for each metal chosen but preferred quantities can be generally set at about 3% of the metal oxide of the group (1) metal to about 12% of the metal oxide to about 1% to 12% of the cobalt oxide. We have found that the better results are obtained when the total mixed metal oxide content approaches about 10% to about 15% by weight of the total composition, and that not much better results are obtained when higher quantities of the mixed metal oxides on carbon are used.

It is not known for certain what valence state the metal oxide components of the catalyst compositions are in but it is believed that probably a mixed valence state exists since carbon might tend to provide a reducing atmosphere upon being heated and thus to reduce to a lower valent metal oxide a portion of the metal oxide produced upon heating and activating the mixed salt impregnated carbon compositions. The term "metal oxide" as applied to the use of the various listed metals means the metal in any of its oxide forms.

The salts of any of the metals described above which are used in preparing the catalyst composition are preferably those which are fairly readily soluble in water, or ammonium hydroxide or nitric acid, and decomposable at moderate heat levels in the carbon matrix. There are many salts of these metals which can be used with equivalent results for getting the metal, first, into solution as the salt, and then into the carbon in sufficient concentration to do an effective catalyst job upon decomposition of the salt to the oxide and activation of the catalyst. A few examples will apprise those in the art of the type of salt which can be used. The metal salts of nitric acid, acetic acid, formic acid are especially preferred. Other types include the metal salts of citric acid, lactic acid, the metal salts of the other lower alkanoic acids such as propionic acid, butanoic acid, etc. In some cases, the oxalic acid salts of some of the metals may be used. Examples of such salts include ferric acetate, ferric ammonium oxalate, ferric lactate, ferric nitrate·$6H_2O$, ferrous sulfate, magnesium acetate, magnesium nitrate, zinc acetate, zinc nitrate, zinc sulfate, lead acetate, lead nitrate, bismuth citrate, bismuth nitrate, nickel formate, nickel nitrate, nickel sulfate, cupric acetate, cupric nitrate, cupric salicylate, cuprous nitrate, aluminum acetate, aluminum nitrate, etc.

The salt of the metal of group (1) above or the metal oxide itself is preferably dissolved in water or other suitable solvent such as nitric acid or ammonium hydroxide solutions and then conveniently the ammoniated carbon, after being dried to constant weight is usually added to a given volume of the metal salt solution which has the concentration equivalent to the metal oxide content desired. After the carbon has taken up the solution, the wet impregnated carbon thus obtained is dried, and heated in an inert gas such as nitrogen, helium, etc., or in a vacuum to a temperature sufficient to decompose the metal salt and to form the metal oxide and volatile gaseous by-products which are easily removed by means known in the art. This is preferably done prior to the cobalt salt impregnation as well as after the cobalt salt impregnation.

At least one ammoniation treatment of the mixed metal oxide on carbon catalyst composition is essential to the advantageous results obtained according to this invention. As stated above it is preferred to pretreat the carbonaceous support with ammonia before the metal salts are impregnated into the carbon. This is sufficient for some catalytic effectiveness but we have found it to be particularly valuable to the polymerization process of this invention to treat the dried cobalt salt and metal oxide impregnated ammoniated carbon with an additional ammoniation treatment prior to activation of the composition for use as a catalyst. If no previous carbon ammoniation treatment has been used, it is essential that the composition be ammoniated after the metal salts have been impregnated into the carbon.

Although we do not care to be bound by any particular theory, we believe that the ammoniation treatment serves to stabilize the active catalytic form of cobalt and other metal oxide on the carbon so that the catalyst composition aids in giving the desired type of dimer product. The ammoniation treatment may be done batch-wise or continuously by suitable choice of equipment. The treated carbon is allowed to take up as much ammoniating agent as it is able, and then the thus treated carbon is dried as before, and activated.

The cobalt and metal oxide containing carbon preferably after being ammoniated as described above, is heated to obtain the active catalyst composition. The activation temperature is critical to the type of dimerization to be conducted with the catalyst. For dimerizing alpha-olefins, e.g., ethylene, propylene, 1-hexene, etc. to products which are liquids under ordinary conditions the above prepared composition is preferably activated at a temperature above 200° C. but not higher than about 300° C.

We have found that it is not desirable to activate these catalyst compositions by heating them to much above 300° C. since when such higher temperatures are used increasing amounts of isomerization of the liquid dimer product occurs, both in the straight chain fraction and in the branched chain fraction. In some alpha-olefin dimerizations this isomerization action of the catalyst gives rise to particularly troublesome isomer separation problems. For example, when propylene is the starting alpha-olefin and it is dimerized with one of the catalyst compositions described herein, which has been activated by heating the composition above 300° C., increased amounts of isomerization products such as 2-methyl-pentene-2 which arises from the isomerization of cis- and trans-4-methylpentene-2 in the propylene dimer liquid product. The 2-methylpentene-2 isomer, however, is only difficultly removable from the straight chained mixed hexene fraction of the liquid product. When, however, the activation temperature is maintained below about 300° C., preferably 260°–300° C., the catalytic action of these compositions is substantially only that of dimerization of the alpha-olefin feed and little or no isomerization occurs so that the above mentioned 2-methylpentene-2 separation problem can be avoided or substantially minimized.

The activation of the catalyst composition is conducted in the presence of an inert atmosphere which may be an inert gas such as nitrogen, helium, methane, propane, carbon dioxide, ammonia, or a vacuum atmosphere etc. Optionally, the catalyst may be heated in the presence of air to the desired temperature, and then the air may be flushed out or removed and replaced with an inert gas for a short time prior to the termination of the activation treatment. For example, in continuous runs for polymerizing the olefin, the catalyst is placed in a basket and gas or liquid feed is passed through this basket. It is within the scope of this invention to activate the catalyst composition by heating it in air for a time and then just prior to its use in the continuous polymerization process, to pass an inert gas over it for a short time, say, from 0.1 to 1 hour at the desired activation temperature just prior to the polymerization reaction.

The time period for the activation treatment can be any period required to raise the temperature of the catalyst composition to the desired temperature. Generally, time periods from 0.5 to 10 hours are sufficient to activate the catalyst to the desired activity. Preferred times of from 2 to 5 hours are used to insure complete activation in efficient time periods. Often times the catalyst composition is activated by gradually raising the temperature from the last drying step under vacuum to the desired temperature. For example, optimum activation conditions for preparing a catalyst for use in dimerizing propylene to products useful in preparing olefins in an economical manner involve heating the dried impregnated ammoniated carbon and re-ammoniated (termed the post-treatment) to a temperature of about 200° C. to 280° C. while passing an inert gas, such as nitrogen, through the activation vessel for from 0 to 5 hours under vacuum of about 5 to 760 mm. of mercury, preferably 35 to 50 mm. of mercury.

Just prior to use in the polymerization reaction but after activation it is preferred that the catalyst should not be in contact with air. To prevent this we have transferred the activated catalyst from one container to another, especially for use in batch type reactions as needed, under nitrogen or other inert atmosphere to prevent any possible deactivation by deleterious materials. However, we have found that if these catalysts are exposed to air in an amount to deactivate them for alpha-olefin dimerization reactions of this invention, the catalyst can be re-activated by heat treatment under the conditions described above.

The polymerization process of this invention is conducted by contacting the alpha-olefin with a catalyst, described above, at temperatures of from about $-10°$ to $200°$ C., preferably at temperatures of from about $10°$ C. to about $85°$ C. for dimerizing $C_2$–$C_4$ olefins, and $50°$ to $150°$ C., for $C_5$–$C_{10}$ olefins at pressures of from atmospheric to 2500 p.s.i.g., preferably at from about 150 p.s.i.g. to 1000 p.s.i.g. Although the reaction will proceed at atmospheric pressure the conversion is low so that an optimum pressure of from about 150 p.s.i.g. to 1000 p.s.i.g. is desirably used. Reaction temperature below those stated may be used but at such temperatures the rate of conversion of alpha-olefin to dimer product is slow. At temperatures much above that stated the life of the catalyst is shortened to an undesired extent, i.e., the catalyst becomes inactive in much shorter time periods at such temperatures. Within the given pressure ranges no substantial difference in isomer distribution of product to branched chain isomers appears to be obtained. However, with decreasing catalyst activity increasing selectivity with respect to the favoring of production of straight chain olefins is observed.

Various types of reactor equipment can be used to conduct the polymerization reaction of this invention. The process can be adapted to use in rocking autoclave systems, fluidized bed systems, continuous tubular flow reactor systems, etc., which are known in the art for preparing liquid polymer products. The process may be conducted by reacting the olefin in a liquid slurry system at atmospheric pressure, but elevated pressures, as described are preferred. In autoclave systems the reaction is conducted under autogenous pressures which can vary from atmospheric to 1000 p.s.i.g. depending upon the size of the reactor, the temperature of reaction, the amount of catalyst used, etc. In continuous flow reactors employing a fixed bed of catalyst wherein the gaseous or liquified olefin is passed over or through the catalyst bed, weight space velocities of the olefin feed can be varied between about 0.1 and about 40 g. of olefin per hour per gram of catalyst composition.

A preferred method of operation of the process is to pass the alpha-olefin-containing feed under pressure through filter, or molecular sieve devices, which are known in the art, to insure removal of any substantial amounts of water or materials which may poison the catalyst and then into the reactor at pressures sufficient to keep most if not all of the olefin feed in the liquid phase, and through the catalyst bed.

The temperature of the reaction mixture is kept at the desired temperature by warming or cooling devices. When operation at ambient temperature is desired no heating device need be used. When the olefin reactant is a two to four carbon olefin the process of the invention operates well by allowing the olefin-containing feed to pass through the catalyst bed at room temperature and allowing the temperature to rise somewhat as a result of the slight exothermic nature of the reaction. When the olefin being treated has a higher number of carbon atoms it is preferred to conduct the dimerization at temperatures ranging from about 50° to 150° C. This technique works especially well with new catalyst materials. As the activity of the catalyst falls off, we have found that the activity can be raised by then raising the temperature to from 75° to about 200° C., especially for dimerizing the higher olefins. The olefin conversion rate to dimer may be kept at a fairly constant rate by using lower olefin feed flow rates through the catalyst bed, e.g., from 0.1 to 2 grams of olefin per gram of catalyst per hour. Reactor pressures of from about 500 to about 900 p.s.i.g. are preferred for maintaining liquid contact at temperatures of from 10° to 150° C. of olefin feed with catalyst. However, lower pressures, on the order of down to 50 to 300 p.s.i.g. may be used. At these lower pressures, a portion of any normally gaseous olefin may be in the gaseous phase. While high flow rates of olefin over the catalysts are usually initially used (20 to 40 g. of olefin per gram of catalyst per hr.) the rate of conversion may be maintained at a fairly high level by reducing the flow rate as the activity of the catalyst falls off.

The olefin feed may contain, besides the olefin up to, say, 50% of paraffin hydrocarbon of the same number of carbon atoms. Higher quantities of the paraffin may be used, however, at the expense of the loss of some conversion of olefin to dimer. The feed may also contain trace amounts of certain sulfur containing compounds such as thiophene and 1,2-ethanedithiol. Quantities of such compounds on the order of from 10 to 20 p.p.m. of feed actually enhance the conversion of the olefin to dimer, although quantities much in excess of 30 p.p.m. tend to reduce the conversion. We have found that for this catalyst system, compounds such as carbon monoxide, and dienes, i.e., diolefins, alkynes, act as poisons, causing a reduction in the activity of the catalyst and hence should be avoided.

The invention is further illustrated by the following examples which illustrate various aspects of the invention.

EXAMPLE 1

This example illustrates the preparation of ammoniated cobalt oxide on carbon catalysts, containing about 1%, 3%, 5%, and 13%, respectively of cobalt oxide on ammoniated activated carbon (termed B-C). These catalysts and the use of them in olefin polymerization are used as the "standards" or "controls" against which the ammoniated mixed metal oxide catalyst compositions, described hereinafter will be compared in their effectiveness in polymerizing olefins.

B-1% CoO/B-C

To a solution of 0.78 g. of cobalt nitrate hexahydrate (equivalent to 0.2 g. of CoO) in 25 ml. of water there was added 20 g. of an ammoniated activated carbon, which had been prepared by treating 600 g. of a commercially available activated carbon (Pittsburgh Coke and Chemical Company's type "BPL") with 1 liter of concentrated ammonium hydroxide, and then drying the ammoniated carbon in a vacuum oven. The cobalt nitrate impregnated carbon thus obtained was vacuum oven dried and then impregnated with 40 ml. of concentrated ammonium hydroxide, air dried in a hood, and then vacuum oven dried. After drying, the composition thus obtained was heated to 275° C. in nitrogen flowing at 87 ml./min. at 35 mm. vacuum pressure for 2 hours.

B-3% CoO/B-C

To a solution of 2.33 g. of cobalt nitrate hexahydrate (equivalent to 0.6 g. of CoO) in 25 ml. of water there was added 20 g. of ammoniated activated carbon, prepared as described above. The dried cobalt nitrate impregnated ammoniated carbon was treated with ammonium hydroxide, dried, and activated as described above.

B-5% CoO/B-C

To a solution of 3.88 g. of cobalt nitrate hexahydrate (equivalent to 1.0 g. of CoO) in 24 ml. of water there was added 19 g. of ammoniated carbon, prepared as described above. After drying, the cobalt nitrate impregnated activated carbon was impregnated with 42 ml. of concentrated ammonium hydroxide, dried, and activated as described above.

B-13% CoO/B-C

To a solution of 11.65 g. of cobalt nitrate hexahydrate in 20 ml. of water there was added 20 g. of an ammoniated activated carbon ("BPL" charcoal). The resulting mixture was dried in a vacuum oven overnight. The dried cobalt nitrate impregnated carbon thus obtained was treated with 35 ml. of concentrated ammonium hydroxide, dried, and then activated as described above.

Each of the above catalysts was used to dimerize alpha-olefins, using propylene as the typical alpha-olefin in each case:

Into standard rocking type autoclave reactors there was placed about 2-3 g. of one of the above catalysts, 10 ml. of heptane, and then the autoclaves were filled with from about 100–135 g. of propylene, and sealed. Some of the reactors were allowed to rock at room temperature for 5 hours. Others containing the same catalysts were heated to 85° C. for 5 hours. After this time, the bombs were vented of any unreacted propylene, and the liquid product was separated from the wet catalyst. The weight of the heptane was subtracted from the weight of the liquid product obtained, and the remainder was taken as the yield of liquid product resulting from the polymerization in that run. In each case the liquid product was at least about 95% $C_6$ dimer of propylene. The yields of liquid product in terms of grams of liquid product per gram of catalyst is summarized below:

| Wt. percent CoO in Catalyst | Yield g. of liquid/g. catalyst | |
|---|---|---|
| | R.T. (25° C.) | 85° C. |
| 1 | 0.7 | 0.8 |
| 3 | 6.56 | 11.2 |
| 5 | 25.1 | 11.5 |
| 13 | 40 | 30 |

EXAMPLE 2

B–5% CoO/8% IRON OXIDE/B-C

To a solution of 31.8 g. of ferric nitrate nonahydrate (equivalent to 4.4 g. of Fe) in 45 ml. of water there was added 50 g. of a previously ammoniated activated carbon (abbreviated B-C). The impregnated carbon was vacuum oven dried overnight and activated by heating it to 275° C. in a flowing nitrogen stream (87 ml./min.) at 35 mm. pressure for 1 hour. The resulting iron oxide/B-C, which was not picked up by a magnet, was allowed to cool to 60° C. and poured into a dish in which it was treated with a solution of 12.0 g. of cobalt nitrate hexahydrate in 50 ml. of water. The cobalt salt impregnated/iron oxide/B-C composition thus obtained was vacuum oven dried and then impregnated with 100 ml. of concentrated $NH_4OH$ and air dried and then vacuum oven dried until a weight of 61.4 g. of product was obtained. A 10 g. portion was activated in nitrogen (flowing at 87 ml./min./35 mm. vacuum) for 2 hours to obtain a catalyst described by B-cobalt oxide/iron oxide/B-C. Another 11 g. portion of the catalyst was activated in flowing nitrogen at 450° C. for two hours. These catalyst compositions contain about 5% cobalt oxide and 8% iron oxide by weight.

Catalyst compositions calculated to contain approximately 3% cobalt oxide on top of 10% iron oxide on ammoniated carbon, and 1% cobalt oxide on top of 12% iron oxide on ammoniated carbon were also prepared as above using the following proportions of chemicals:

B–3% CoO/10% IRON OXIDE/B-C

Step 1

| | |
|---|---|
| Activated carbon—ammoniated _____g__ | 50 |
| $Fe(NO_3)_3.9H_2O$ (eq. to 5.75 g. Fe) _____g__ | 41.6 |
| $H_2O$ _____ml__ | 65 |

Step 2 (after activation of above)

| | |
|---|---|
| $Co(NO_3)_2.6H_2O$ (eq. to 1.75 g. CoO) _____g__ | 6.8 |
| $H_2O$ _____ml__ | 75 |

Step 3 (after drying above)

| | |
|---|---|
| $NH_4OH$ (conc.) _____ml__ | 100 |

Step 4 (activation at 275° in flowing nitrogen)

B–1% CoO/12% IRON OXIDE/B-C

Step 1

| | |
|---|---|
| Activated carbon (ammoniated) _____g__ | 50 |
| $Fe(NO_3)_3.9H_2O$ (eq. to 6.92 g. Fe) _____g__ | 50.1 |
| $H_2O$ _____ml__ | 65 |

Step 2 (after drying and activation)

| | |
|---|---|
| $Co(NO_3)_2.6H_2O$ (eq. to 0.58 g. of CoO) _____g__ | 2.25 |
| $H_2O$ _____ml__ | 75 |

Step 3 (after drying)

| | |
|---|---|
| $NH_4OH$ _____ml__ | 100 |

Step 4 (activation at 275° C. in flowing nitrogen)

Using an ammoniated catalyst composition containing 5% cobalt oxide on 8% iron oxide on ammoniated carbon to polymerize olefins in the manner described in Example 1, the following results were obtained.

| Catalyst—B–5% cobalt oxide/8% iron oxide/B-C: | G./g. of catalyst |
|---|---|
| 5-hr. room temp. bomb run _____ | * 40.8 |
| 5-hr. 85° C. bomb run _____ | * 22.1 |

*Average of three runs.

EXAMPLE 3

To a solution of 17.1 g. of nickel nitrate hexahydrate (equivalent to 4.4 g. of NiO) in 50 ml. of water there was added 50 g. of an ammoniated activated carbon. After allowing the carbon to absorb as much of the solution as possible it was vacuum oven dried overnight, and then activated by placing the nickel nitrate impregnated ammoniated carbon in an activation tube and then passing nitrogen through it at 275° C. at a rate of 87 ml./min. under vacuum at 35 mm. for 1.5 hours to obtain the nickel oxide impregnated ammoniated carbon.

The activated impregnated carbon so obtained was allowed to cool under nitrogen and vacuum to 80° C. and then poured into a dish.

To the nickel oxide/B-carbon so obtained there was added a solution of 12.0 g. of cobalt nitrate hexahydrate (equivalent to 3.1 g. of cobalt oxide) in 50 ml. of water. After absorbing the cobalt nitrate solution, the impregnated carbon was vacuum oven dried as before, and then impregnated with 100 ml. of concentrated $NH_4OH$ and then air dried, and vacuum oven dried until a weight of 57.4 g. was obtained. Ten grams of the composition thus obtained was activated by passing nitrogen through the impregnated carbon at 87 ml./min. at a 35 mm. vacuum for 2 hours at 275° C. In this treatment the cobalt nitrate is decomposed to the cobalt oxide. The resulting catalyst composition can be described in abbreviated symbols as a B-CoO/NiO/B-C catalyst wherein B denotes ammoniation treatment before and after the nickel nitrate and cobalt nitrate are put on the activated carbon support. This catalyst contains approximately 5% CoO and 8% NiO by weight.

Using the above catalyst, the polymerization of propylene in a bomb reactor gave the following results:

| Catalyst—B-5% CoO/8% NiO/B-C: | G./g. of catalyst |
|---|---|
| 5-hr. R.T. bomb run _____ | * 27.0 |
| 5-hr. 85° C. bomb run _____ | * 14.0 |

*Average of two runs.

EXAMPLE 4

An ammoniated cobalt oxide copper oxide on ammoniated activated carbon catalyst (B-CoO/CuO/B-C) catalyst was also prepared by impregnating 50 g. of ammoniated carbon with a solution of 13.3 g. of copper nitrate trihydrate (equivalent to 4.4 g. of CuO) in 60 ml. of water, and then air drying and vacuum oven drying the impregnated carbon to a weight of 50.0 g. After cooling the CuO/B-C composition thus obtained was added to a solution of 12.0 g. of cobalt nitrate hexahydrate (equivalent to 3.1 g. of CoO) in 65 ml. of water, dried, and impregnated with 100 ml. of concentrated $NH_4OH$. After drying and activating by heating the composition as in the prior examples at 275° C. in flowing nitrogen the resulting catalyst composition contained 5% CoO and 8% CuO and can be described as a B-CoO/CuO/B-C catalyst.

Using the above B–5% CoO/8% CuO/B-C catalyst composition in polymerization of propylene according to the procedure described in Example 1, conversion results were as follows:

| Catalyst—B-5% CoO/8% CuO/B-C: | G./g. of catalyst |
|---|---|
| R.T. _____ | * 12.6 |
| 5-hr. 85° C. bomb run _____ | * 7.0 |

*Average of two runs.

EXAMPLE 5

Various other double ammoniated catalyst compositions of the type B–CoO/Metal Oxide/B-C, where B denotes an ammoniation treatment were also prepared in the manner described in the above examples using heat decomposable salts of the metal for comparison with double ammoniated cobalt oxide on carbon catalyst compositions of the type B–CoO/B–C in their effectiveness to dimerize alpha olefins to liquid olefin products.

For each of these catalyst compositions, the carbon support used was an activated carbon which had been treated with concentrated ammonium hydroxide, and then dried.

For each catalyst composition that was prepared a weighed portion of the ammoniated activated carbon was added to a solution of a salt of the respective metal which salt was decomposable to the metal oxide upon heating of the salt impregnated carbon up to 300° C. The solution had a concentration which was equivalent to the desired percentage of the metal oxide. After allowing the carbon to absorb the salt solution, the salt impregnated carbon was dried and heated in an inert gas or a vacuum to decompose the metal salt on the carbon to the metal oxide. After cooling somewhat, a weighed portion of the metal oxide impregnated carbon was added to a solution of a cobalt salt solution having a concentration which was equivalent to the desired percentage of cobalt oxide. After drying as before, the cobalt salt impregnated composition thus obtained was treated with concentrated ammonium hydroxide, air dried and then vacuum dried, and then heated to decompose the cobalt salt and to activate the catalyst composition at the desired temperature in the range of from about 260° C. to 300° C.

Portions of each of the activated ammoniated mixed metal oxide on ammoniated carbon compositions thus obtained were then used as the catalyst for dimerizing propylene to hexene products in rocking type bomb reactors as described in Example 1. In each of the runs where polymerization did occur the products were for the most part liquid at least 95% of which were hexenes.

The results of propylene dimerization with these ammoniated mixed metal oxide catalysts were as follows when the catalyst contained about 5% by weight of cobalt oxide and about 8% by weight of the other metal oxide.

| Catalyst | | 5 Hour Bomb Run (g. of liquid product/g. of catalyst) | |
|---|---|---|---|
| CoO | Metal Oxide | R.T. | 85° |
| 5% | 0% (control) | 25.1 | 11.5 |
| 5% | Fe$_2$O$_3$—8% | 40.8 | 22.1 |
| 5% | NiO—8% | 27.0 | 14.0 |
| 5% | CuO—8% | 12.6 | 7.0 |
| 5% | MnO—8% | 7.8 | 8.2 |
| 5% | MgO—8% | 38.7 | 23.9 |
| 5% | ZnO—8% | 50.5 | 28.5 |
| 5% | ZrO$_2$—8% | 37.5 | 35.3 |
| 5% | Al$_2$O$_3$—8% | 31.1 | 17.6 |
| 5% | B$_2$O$_3$—8% | 2.0 | 3.3 |
| 5% | LiO—8% | 0 | 0 |
| 5% | PbO—8% | 28.5 | 25.3 |
| 5% | Bi$_2$O$_3$—8% | 29.4 | 22.7 |
| 3% | Fe$_2$O$_3$—10% | 13.8 | 3.0 |
| 3% | NiO—10% | 11.6 | 7.2 |
| 3% | CuO—10% | 7.0 | 4.2 |
| 3% | MnO—10% | 1.9 | 3.0 |
| 3% | MgO—10% | 23.4 | 16.7 |
| 3% | ZnO—10% | 26.2 | 14.1 |
| 3% | ZrO$_2$—10% | 29.6 | 15.6 |
| 3% | Al$_2$O$_3$—10% | 9.0 | 3.0 |
| 3% | PbO—10% | 34.4 | 18.0 |
| 3% | Bi$_2$O$_3$—10% | 14.4 | 11.6 |
| 3% | 0% (control) | 6.56 | 11.2 |

Ammoniated mixed metal oxide catalysts containing only about 1% of cobalt oxide and about 12% of the other metal oxide were also prepared and compared with an ammoniated 1% cobalt oxide on ammoniated carbon in propylene dimerization under identical conditions with the following results:

| Catalyst | | 5 Hour Bomb Run (g. of liquid product/g. of catalyst) | |
|---|---|---|---|
| CoO | Metal Oxide | R.T. | 85° |
| 1% | 0% (control) | 0.7 | 0.8 |
| 1% | Fe$_2$O$_3$—12% | 15.6 | 5.2 |
| 1% | NiO—12% | 3.2 | 2.6 |
| 1% | CuO—12% | 1.9 | 0.08 |
| 1% | MnO—12% | 0 | 1.2 |
| 1% | MgO—12% | 4.2 | 1.9 |
| 1% | ZnO—12% | 16.0 | 5.5 |
| 1% | ZrO$_2$—12% | 4.5 | 3.9 |
| 1% | Al$_2$O$_3$—12% | 1.5 | 1.1 |
| 1% | PbO—12% | 12.1 | 7.4 |
| 1% | Bi$_2$O$_3$—12% | 3.0 | 3.5 |
| Other runs | | | |
| 13% | 0% | 40 | 30 |

EXAMPLE 6

This example illustrates the dimerization process of the invention using catalyst compositions prepared by impregnating the cobalt salt on the metal salt impregnated carbon without heating the metal salt to activation temperature before the cobalt salt is applied.

For this example, three compositions were prepared, each have different weight percents of cobalt oxide and metal oxide impregnated into the carbon. For this example, ferric nitrate was used as the illustrative metal oxide percursor.

For these compositions, a common batch of ammoniated carbon was prepared adding 1 liter of concentrated ammonium hydroxide to 600 g. of a commercially available activated carbon (Pittsburgh Coke and Chemical Company's type "BPL"), and then after the carbon had absorbed as much of the ammonium hydroxide as possible, it was vacuum oven dried.

Three 50 g. portions of this ammoniated carbon were added to varying amounts of ferric nitrate nonahydrate dissolved in 65 ml. of water as follows:

(a) 33.3 g. of ferric nitrate nonahydrate (equivalent to 4.6 g. of iron)

(b) 41.6 g. of ferric nitrate nonahydrate (equivalent to 5.75 g. of iron)

(c) 50.1 g. of ferric nitrate nonahydrate (equivalent to 6.92 g. of iron)

Each mixture was air dried on a hot plate to evaporate excess water and then vacuum oven dried overnight.

Each of the dried ferric nitrate impregnated carbons thus obtained was then added to an aqueous solution containing the following weight percents of cobalt nitrate hexahydrate in about 70–75 ml. of water as follows:

(a) 11.3 g. of cobalt nitrate hexahydrate (equivalent to 2.9 g. of CoO)

(b) 6.8 g. of cobalt nitrate hexahydrate (equivalent to 1.75 g. of CoO)

(c) 2.25 g. of cobalt nitrate hexahydrate (equivalent to 0.58 g. of CoO)

Each composition was dried in a vacuum oven after impregnation of the cobalt salt solution, and then each composition was impregnated with 100 ml. portions of concentrated ammonium hydroxide.

Approximately 10–11 g. portions of each composition (a), (b), and (c) thus obtained was heated to 275° C. in flowing nitrogen (87 ml./min.) at 35 mm. vacuum pressure for 2 hours to decompose the metal salts to the oxides and to activate the compositions for use as catalysts.

The activated compositions can be defined in the following method.

(a) B–5%-cobalt oxide+8% iron oxide/B-C
(b) B–3%-cobalt oxide+10% iron oxide/B-C
(c) B–1%-cobalt oxide+12% iron oxide/B-C wherein the plus sign (+) between the metal oxide in each composition denotes that the two metal salts were impregnated into the carbon before activation.

Small portions, approximately equal of each catalyst (a), (b), and (c), above were placed in six bomb reactors, the bombs were filled with propylene, and 10 ml. of heptane, as solvent, and sealed. Three filled bomb reactors, containing catalysts (a), (b), and (c) respectively were placed in a rocking mechanism and rocked for 5 hours at room temperature. The other three filled bomb reactors, also containing catalysts (a), (b), and (c) respectively were heated to 85° C. for five hours. The data from each dimerization run is summarized below:

|  | Runs | | |
| --- | --- | --- | --- |
|  | (a) | (b) | (c) |
| Room Temperature: | | | |
| Wt. catalyst (g.) | 2.4 | 2.3 | 2.2 |
| Wt. propylene (g.) | 135 | 140 | 135 |
| Heptane (g.) | 6.8 | 6.8 | 6.8 |
| Conversion $C_3H_6$ (percent) | 42.6 | 17.0 | 5.1 |
| Total liquid (g.) | 64.3 | 30.5 | 13.7 |
| Liquid product (g.) | 57.5 | 23.7 | 6.9 |
| G. of liquid product/g. of catalyst | 24.0 | 10.3 | 3.1 |
| 85° C. Runs: | | | |
| Wt. catalyst (g.) | 2.4 | 2.5 | 2.6 |
| Wt. propylene (g.) | 100 | 100 | 110 |
| Heptane (g.) | 6.8 | 6.8 | 6.8 |
| Conversion, percent | 36.8 | 14.5 | 14.8 |
| Total Liquid (g.) | 43.6 | 21.3 | 23.1 |
| Liquid product (g.) | 36.8 | 14.5 | 16.3 |
| G. of liquid product/g. of catalyst | 15.4 | 5.8 | 6.3 |

Comparing these liquid products to catalyst weight ratios with those obtained for catalysts having similar percentages of cobalt oxide and iron oxide but prepared by heating the ferric nitrate impregnated carbon to activation temperature prior to cobalt nitrate impregnation (Example 2 above), it can be seen that it is preferred to heat the salt of the metal of group (1) above in the carbon to activation temperature prior to cobalt salt impregnation.

EXAMPLE 7

This example illustrates the alpha-olefin dimerization process of the invention conducted on a continuous flow basis during the practical life of the catalyst.

For this run, the catalyst used was an ammoniated cobalt oxide on iron oxide on ammoniated carbon, specifically a B–5% cobalt oxide/8% iron oxide/B-C prepared as described in Example 2 above.

In a standard tubular flow reactor, the catalyst basket was loaded under nitrogen with about 9.0 g. of the above catalyst. The tubular reactor was flushed with nitrogen, and then with nitrogen still flowing through the reactor the catalyst basket containing the catalyst was inserted. The reactor was sealed and pressurized to 400 p.s.i.g. with nitrogen. Then propylene was pumped into the reactor and maintained at a pressure of 400 p.s.i.g. throughout the run. A total of 10,270 g. of propylene had passed over the catalyst in 94 hours. The liquid product of the reaction was collected in a trap maintained at −35° to −37° C.

The average productivity of the catalyst during the course of run was determined from samples taken at intervals during the run and the results are tabulated below:

| Hour in Run | Average Productivity, g./g. of catalyst/Hr. | Percent of Normal-Hexene Isomers in $C_6$ fraction |
| --- | --- | --- |
| 1 | 5.98 | 61.4 |
| 2 | 5.36 | 62.5 |
| 3 | 4.39 | 63.4 |
| 4 | 3.31 | 63.8 |
| 5 | 3.12 | 63.6 |
| 69 | 1.47 | 63.6 |
| 76 | 0.89 | 62.9 |
| 93 | 0.81 | 63.5 |
| 94 | 1.0 | 66.7 |

The total liquid dimer product recovered was 1233.4 g. of which at least about 95% was $C_6$ liquid dimer. The total conversion of propylene to liquid dimer product in terms of grams of liquid product per gram of catalyst was 137.0.

We claim:
1. A process for preparing substantially straight chained liquid olefins which comprises polymerizing an alpha-olefin having from 2 to about 10 carbon atoms at a temperature of from about −10° C. to about 200° C. using as a catalyst therefor an ammoniated mixed metal oxide on activated carbon composition in which the metal oxide components are (1) from about 3% to about 12% by weight of an oxide of zinc, and (2) from about 1% to about 12% by weight of cobalt oxide, said catalyst composition having been prepared by ammoniating an activated carbon, drying the ammoniated activated carbon, impregnating the ammoniated activated carbon with (1) a heat decomposable salt of zinc, the amount of which is equivalent to from about 3% to about 12% by weight of the oxide of zinc, and (2) a heat decomposable salt of cobalt the amount of which is equivalent to about 1% to about 12% by weight of cobalt oxide, and heating the impregnated activated carbon thus obtained to from about 200° C. to about 300° C. in an inert atmosphere.

2. A process for preparing substantially straight chained liquid olefins which comprises polymerizing an alpha-olefin having from 2 to about 10 carbon atoms at a temperature of from about −10° C. to about 200° C. using as a catalyst therefor an ammoniated mixed metal oxide on activated carbon composition in which the metal oxide components are (1) from about 3% to about 12% by weight of an oxide of zirconium, and (2) from about 1% to about 12% by weight of cobalt oxide, said catalyst composition having been prepared by ammoniating an activated carbon, drying the ammoniated activated carbon, impregnating the ammoniated activated carbon with (1) a heat decomposable salt of zirconium, the amount of which is equivalent to from about 3% to about 12% by weight of the oxide of zirconium, and (2) a heat decomposable salt of cobalt the amount of which is equivalent to about 1% to about 12% by weight of cobalt oxide, and heating the impregnated activated carbon thus obtained to from about 200° C. to about 300° C. in an inert atmosphere.

3. A catalyst composition comprising an ammoniated mixed metal oxide on activated carbon composition in which the metal oxide components are (1) from about 3% to about 12% by weight of an oxide of zirconium, and (2) from about 1% to about 12% of cobalt oxide, said catalyst composition having been prepared by ammoniating an activated carbon, drying the ammoniated activated carbon, impregnating the ammoniated activated carbon with (1) a heat decomposable salt of zirconium, the amount of which is equivalent to from about 3% to about 12% by weight of the oxide of zirconium, and (2) a heat decomposable salt of cobalt, the amount of which is equivalent to about 1% to about 12% by weight of cobalt oxide, and heating the thus impregnated activated carbon to from about 200° C. to about 300° C.

4. A catalyst composition comprising an ammoniated mixed metal oxide on activated carbon composition in which the metal oxide components are (1) from about 3% to about 12% by weight of an oxide of zinc, and (2) from about 1% to about 12% of cobalt oxide, said catalyst composition having been prepared by ammoniating an activated carbon, drying the ammoniated activated carbon, impregnating the ammoniated activated carbon with (1) a heat decomposable salt of zinc, the amount of which is equivalent to from about 3% to about 12% by weight of the oxide of zinc, and (2) a heat decomposable salt of cobalt, the amount of which is equivalent to about 1% to about 12% by weight of cobalt oxide, and heating the thus impregnated activated carbon to from about 200° C. to about 300° C.

5. A catalyst composition comprising an ammoniated mixed metal oxide on activated carbon composition in which the metal oxide components are (1) from about 3% to about 12% by weight of an oxide of lead, and (2) from about 1% to about 12% of cobalt oxide, said catalyst composition having been prepared by ammoniating an activated carbon, drying the ammoniated activated carbon, impregnating the ammoniated activated carbon with (1) a heat decomposable salt of lead, the amount of which is equivalent to from about 3% to about 12% by weight of the oxide of lead, and (2) a heat decomposable salt of cobalt, the amount of which is equivalent to about 1% to about 12% by weight of cobalt oxide, and heating the thus impregnated activated carbon to from about 200° C. to about 300° C.

References Cited

UNITED STATES PATENTS

| | | | |
|---|---|---|---|
| 2,332,276 | 10/1943 | Stahly | 260—683.15 X |
| 2,381,198 | 8/1945 | Bailey et al. | 260—683.15 |
| 2,599,249 | 6/1952 | Friedman | 260—680 |
| 2,802,814 | 8/1957 | Feller et al. | 260—683.15 X |
| 3,113,166 | 12/1963 | Weesner | 260—683.15 |

DELBERT E. GANTZ, *Primary Examiner.*

R. H. SHUBERT, *Assistant Examiner.*